United States Patent [19]

Shimizu

[11] Patent Number: 5,399,082
[45] Date of Patent: Mar. 21, 1995

[54] UTENSIL FOR MOLDING SUSHI RICE FOR USE IN PREPARING NIGIRI-ZUSHI

[75] Inventor: Yoshio Shimizu, Toyonaka, Japan

[73] Assignee: Kabushiki Kaisha Sushitaro, Osaka, Japan

[21] Appl. No.: 186,320

[22] Filed: Jan. 25, 1994

[30] Foreign Application Priority Data

Jan. 29, 1993 [JP] Japan .................. 5-002123 U

[51] Int. Cl.⁶ ................................. A47J 43/20
[52] U.S. Cl. .................... 425/408; 425/395; 426/512
[58] Field of Search .......... 425/233, 235, 395, 408, 425/410; 426/512

[56] References Cited

U.S. PATENT DOCUMENTS

| | | | |
|---|---|---|---|
| 1,947,124 | 2/1934 | Clauss | 425/408 |
| 3,741,706 | 6/1973 | Conley et al. | 425/408 |
| 4,437,826 | 3/1984 | Tezuka | 425/408 |
| 4,779,835 | 10/1988 | Fukushima et al. | 425/408 |
| 4,853,509 | 8/1989 | Murakami | 219/10.55 E |

FOREIGN PATENT DOCUMENTS

| | | | |
|---|---|---|---|
| 56-26166 | 3/1981 | Japan . | |
| 56-64757 | 6/1981 | Japan . | |
| 61-152224 | 7/1986 | Japan | 425/408 |
| 2141372 | 12/1984 | United Kingdom | 425/408 |

Primary Examiner—James P. Mackey
Attorney, Agent, or Firm—Armstrong, Westerman, Hattori, McLeland & Naughton

[57] ABSTRACT

Disclosed is a multi-cavity type utensil for molding sushi rice for use in preparing nigiri-zushi. The utensil has a split mold comprising a lower mold member and an upper mold member, and an outer frame for the split mold to removably fit in. The molding cavities defined by partition walls are formed in the lower mold member and the upper mold member. The cavities are arranged in a plurality of rows and have one or more intersections of crisscrossed partition walls. The cavity corners are rounded or beveled at least in a vertical direction. An upwardly and downwardly movable, spring-biased baffle piece is projected from the end surface of the intersection in at least one of the lower and upper mold members.

2 Claims, 7 Drawing Sheets

UTENSIL FOR MOLDING SUSHI RICE FOR USE IN PREPARING NIGIRI-ZUSHI

BACKGROUND OF THE INVENTION

1. Field of the Invention

The present invention relates to a utensil for molding sushi rice for use in preparing nigiri-zushi (slightly vinegared oval-shaped rice balls with sliced raw fish, etc.), and more particularly to a utensil for molding sushi rice which has a split mold comprising a multi-cavity type lower mold member and a multi-cavity type upper mold member, and an outer frame for the split mold to removably fit in.

Cooked sushi rice is molded with a utensil of the type mentioned by placing the lower mold member into the outer frame, filling the sushi rice into a recess defined by the outer frame and the lower mold member, leveling the top of the mass of rice flush with the upper edge of the outer frame as by a bar, inserting the upper mold member into the outer frame and pushing down the upper mold member until the upper mold member fits to the lower mold member, whereby the sushi rice is molded in conformity with the shape of the mold cavity. Using the molding utensil, a plurality of rice moldings substantially equally compressed can be produced with ease. The rice molding is taken out from the molding utensil, and flesh or fish, shellfish or the like is placed on the molding to prepare nigiri-zushi.

The so-called multi-cavity type molding utensil has a plurality of molding cavities in rows. Each corner portion extending in a vertical direction may be horizontally rounded or beveled in an attempt to produce a sushi molding having a contour similar to that obtained by hand-rolling the sushi rice. However, the horizontally rounded or beveled cavity corners pose the following problem. The intersection of crisscrossed partition walls defining the cavities has an end surface in the shape of a rhombus or the like. The rhombus-like end surface of intersection is so broad that the sushi rice becomes partly lodged between the end surfaces of intersections in the lower and upper mold members on downward movement of the upper mold member, thereby failing to be molded into the desired shape.

2. Description of the Prior Art

Conventionally the rounded or beveled cavity corners have not been utilized without overcoming the problem of rice lodgment. Consequently only multi-cavity type molding utensils with right-angled or angular cavity corners have been so far available. The sushi moldings obtained by such molding utensils undesirably have a contour conspicuously suggestive of moldings prepared by molding utensils.

SUMMARY OF THE INVENTION

An object of the present invention is to provide a multi-cavity type utensil for molding sushi rice for use in preparing nigiri-zushi, the utensil having molding cavities with horizontally rounded or beveled corners free of the problem that the sushi rice is lodged between the end surfaces of partition intersections in the upper and lower mold members.

The term "multi-cavity type" used in this specification and the appended claims refers to a type of mold or molding utensil having molding cavities which are arranged in a plurality of rows and include at least one intersection of crisscrossed partition walls. The term "horizontally rounded or beveled corner" used herein means a cavity corner portion extending in a vertical direction and horizontally rounded or beveled.

To fulfill the above and other objects, the present invention provides a multi-cavity type utensil for molding sushi rice for use in preparing nigiri-zushi, the molding utensil having a split mold comprising a lower mold member and an upper mold member, and an outer frame for the split mold to removably fit in, the lower and upper mold members each having molding cavities defined by partition walls, the molding cavities having one or more crisscrossed intersections of partition walls, the molding utensil being characterized in that the corners of the cavities are rounded or beveled at least in a vertical direction and that an upwardly and downwardly movable, spring-biased baffle piece is projected from the end surface of the intersection in at least one of the lower and upper mold members.

The term "spring-biased baffle piece" used in the specification and the appended claims refers to a baffle piece having a spring arranged thereunder to return the piece to the original position after forced depression.

BRIEF DESCRIPTION OF THE DRAWINGS

FIG. 2, B is a perspective view showing the interior of a lower mold member in the embodiment of FIG.

FIG. 3, B is a perspective view showing the interior of a modification of the lower mold member;

FIG. 4, B is a perspective view showing the interior of another modification of the lower mold member;

FIG. 5, B is a perspective view showing cavity corners of other shape in the lower mold member;

DESCRIPTION OF THE PREFERRED EMBODIMENTS

Figure 1:
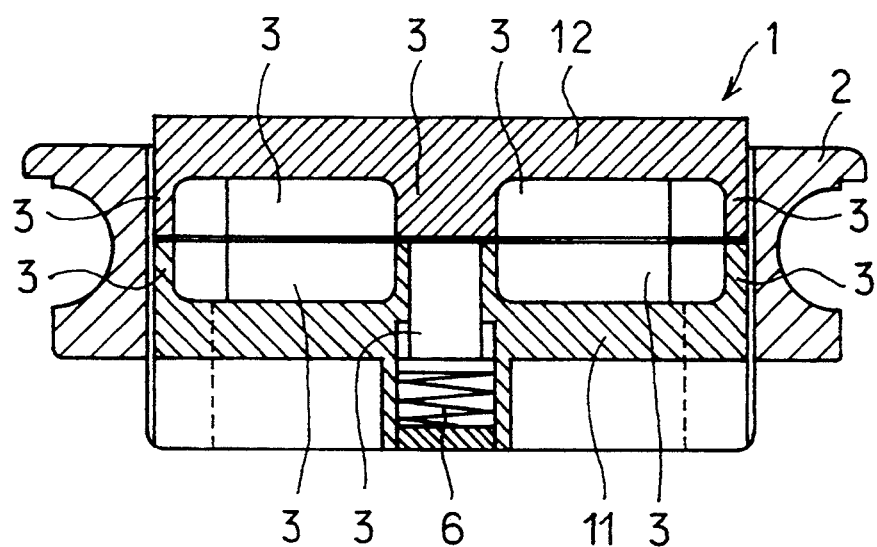
FIG. 1 is a view in longitudinal section showing an embodiment of the present invention.

The drawings show a molding utensil which includes a split mold 1 and an outer frame 2. The split mold 1 comprises a lower mold member 11 and an upper mold member 12. The lower mold member 11 and the upper mold member 12 are of the multi-cavity type wherein molding cavities 10 are provided in a plurality of rows. The outer frame 2 is rectangular and has its upper and lower sides left open for the split mold 1 to be freely inserted thereinto or withdrawn therefrom.

With the illustrated embodiment, the lower and upper mold members 11, 12 are of the multi-cavity type having molding cavities 10 as arranged in 2 rows of 2 cavities, namely a total of 4 cavities arranged. Alternatively these mold members may be of the multi-cavity type with at least 3 cavities arranged in at least 3 rows.

Figure 2A:
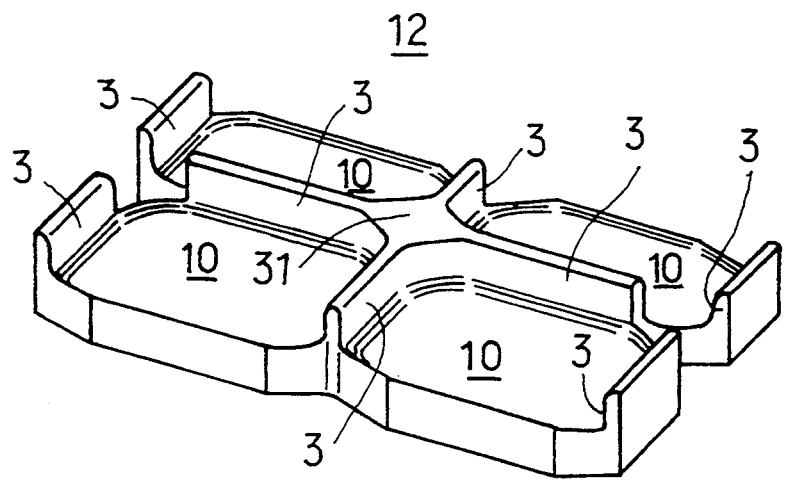
FIG. 2, A is a perspective view showing the interior of an upper mold member in the embodiment, i.e., molding utensil, shown in FIG. 1.
Figure 2B:
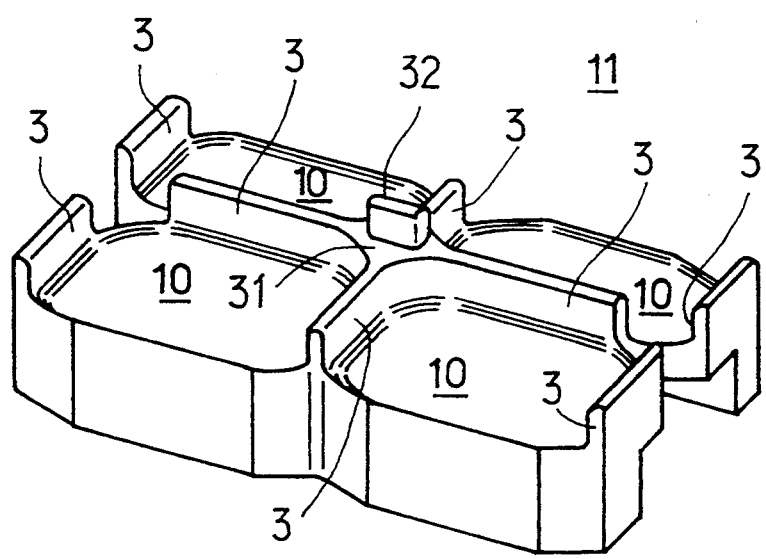
Figure 4A:
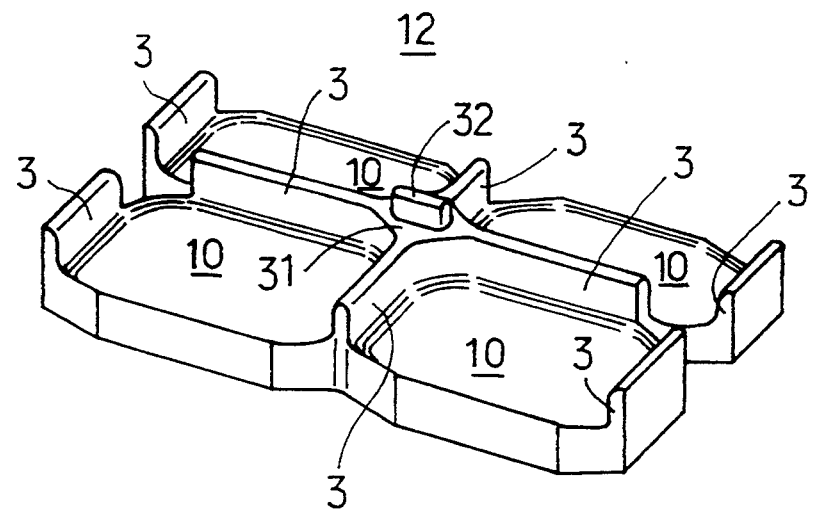
FIG. 4, A is a perspective view showing the interior of another modification of the upper mold member.
Figure 4B:
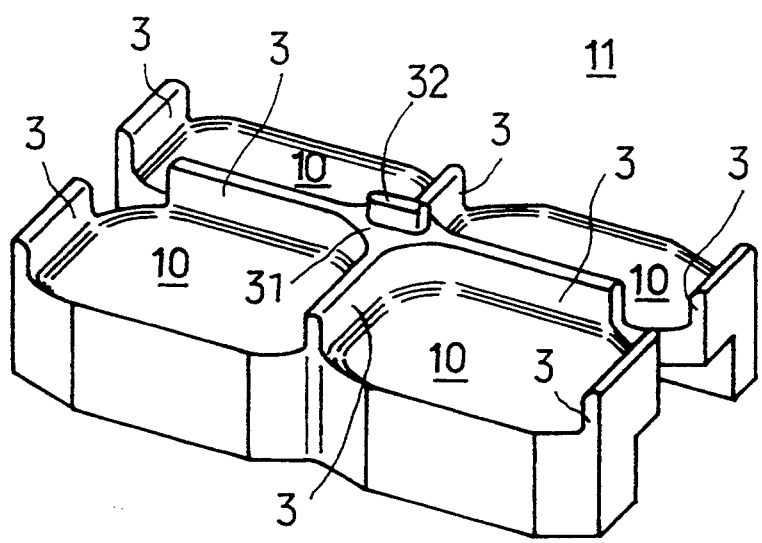
Figure 5A:
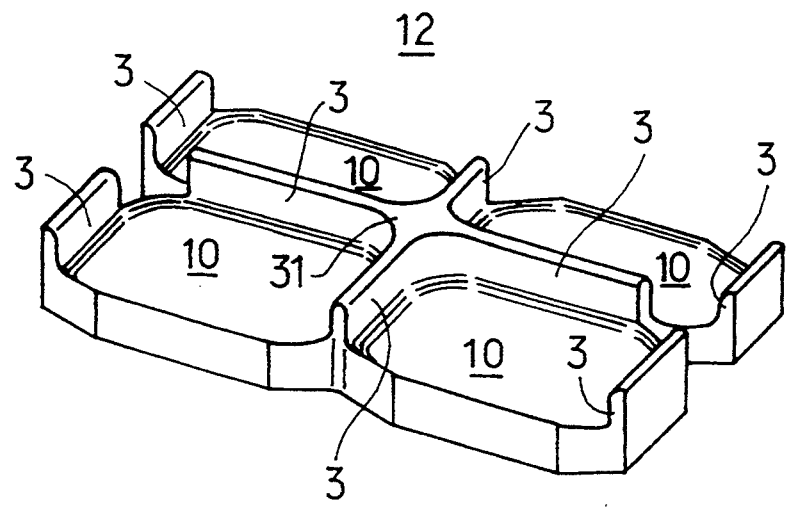
FIG. 5, A is a perspective view showing cavity corners of other shape in the upper mold member.
Figure 5B:
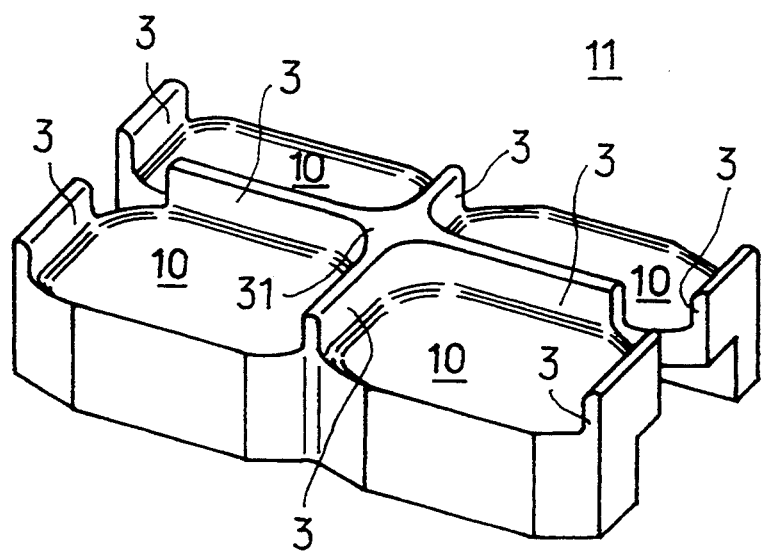
Figure 6:
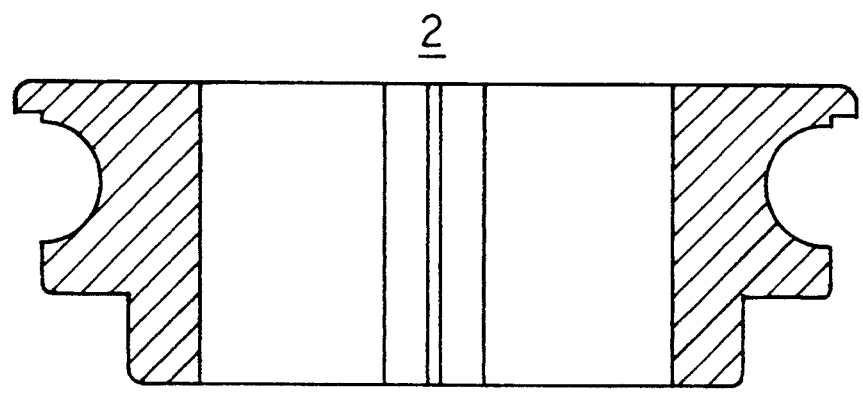
FIG. 6 is a view in longitudinal section showing an outer frame of the embodiment of FIG. 1.
Figure 7:
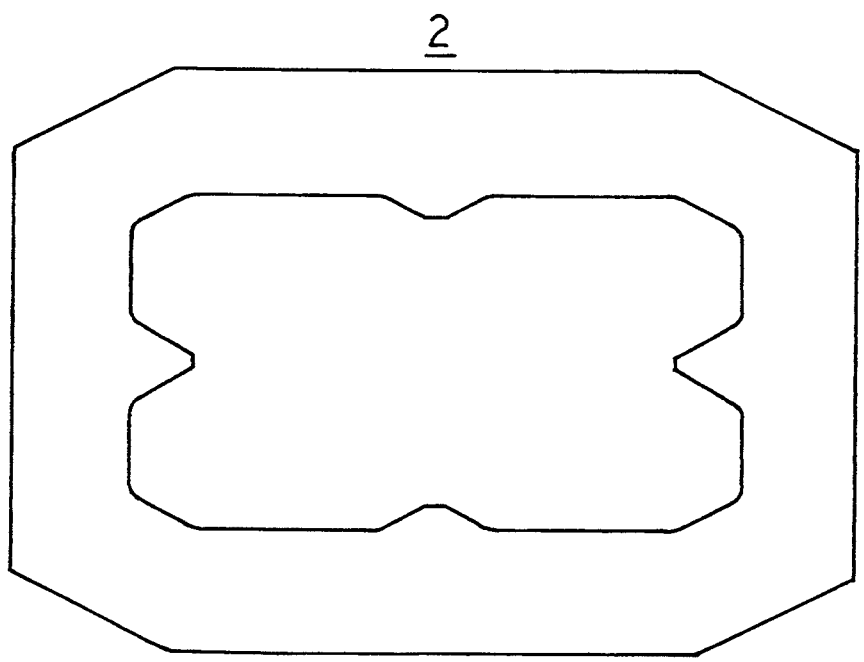
FIG. 7 is a plan view of the outer frame shown in FIG. 6.
Figure 8:
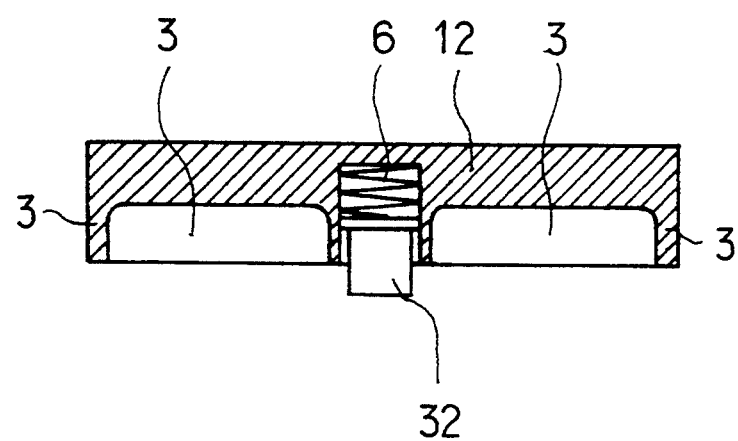
FIG. 8 is a view in longitudinal section showing a baffle piece provided on a partition intersection in an upper mold member.

The cavities 10 as defined by partition walls 3, 3 in the lower and upper mold members 11, 12 have horizontally rounded or beveled corners. The horizontally beveled corners are shown in FIGS. 2, A, B, FIGS. 3, A, B and FIGS. 4, A, B, and the horizontally rounded corners are depicted in FIGS. 5, A, B. It is preferred that the cavity corner horizontally extending as the boundary between the vertically extending side wall and the cavity bottom or ceiling be rounded or beveled. The illustrated embodiments are of this type.

Figure 3A:
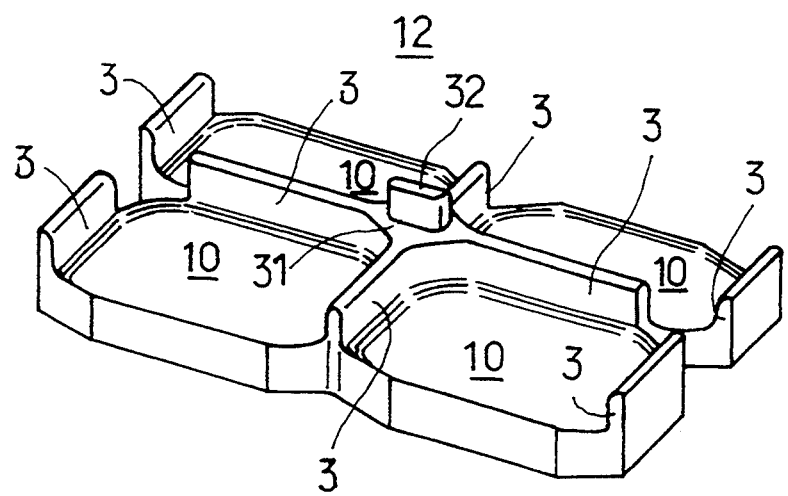
FIG. 3, A is a perspective view showing the interior of a modification of the upper mold member.
Figure 3B:
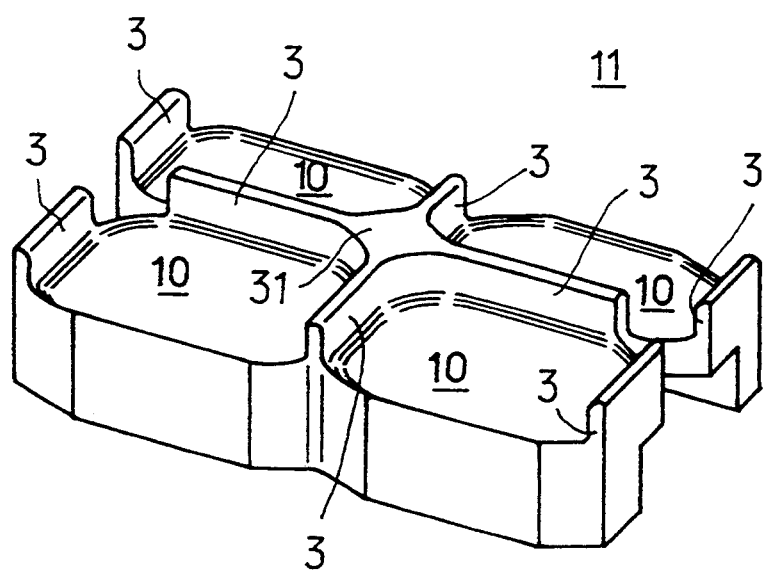

Provided on an intersection 31 of crisscrossed partition walls 3 in at least one of the lower and upper mold members 11, 12 is an upwardly and downwardly movable, baffle piece 32 which is adapted to protrude from the intersection 31. FIG. 2, B shows an embodiment with the baffle piece 32 in the lower mold member 11; FIG. 3, A shows an embodiment with the baffle piece 32 in the upper mold member 12; and FIGS. 4, A, B indicate an embodiment with the baffle pieces 32, 32 in the lower and upper mold members 11, 12, respectively. The baffle pieces 32, 32 in the lower and upper mold members 11, 12, respectively are so positioned as to strike against each other by the insertion of the lower and upper mold members 11, 12 into the outer frame 2. The baffle piece 32 is spring-biased with a spring 6 so that when not depressed, the piece 32 protrudes in a vertical direction. The baffle piece 32 may be in the shape of a plate as shown in drawings. The piece 32 may be similar in the shape of end face to the intersection 31 or may be dissimilar thereto in the shape thereof, for example, may be in a rod-like shape. In either case, preferably the baffle piece 32, when large in thickness or diameter, may be tapered in its entirety or at least in its forward end portion so as to sufficiently prevent the rice lodgment between the end surfaces of the intersections 31, 31.

The baffle piece 32 is omitted in FIGS. 5, A, B. It goes without saying that the same baffle piece as described above is provided on the end surface of the intersection 31 in at least one of lower and upper mold members 11, 12 having cavity corners horizontally shaped as shown in FIGS. 5, A, B. The baffle pieces 32 in the lower and upper mold members 11, 12 as illustrated in FIGS. 5, A, B are disposed on the intersections 31 in the same manner as done for the piece 32 in the lower and upper mold members 11, 12 as shown in FIGS. 2, A, B, FIGS. 3, A, B and FIGS. 4, A, B.

The molding utensil of the invention having the split mold 1 comprising the lower and upper mold members 11, 12, and the outer frame 2 is used in the manner mentioned to mold the sushi rice into a plurality of sushi moldings.

A contour like one formed by hand-rolling the sushi rice is given the sushi molding due to the horizontally beveled or rounded corners of cavities 10 which are defined by the partition walls 3, 3 in the lower and upper mold members 11, 12.

When the upper mold member 12 is pushed downward within the outer frame 2, the baffle piece 32 provided on the intersection 31 of the lower or upper mold member 11 or 12 turns away the sushi rice thrusting against the baffle piece 32 until the baffle piece 32 is brought into contact with the end surface of the intersection 31 formed as opposed to the baffle piece 32. The top of the baffle piece 32 in one mold member is contacted with the end surface of the intersection 31 in the other mold member, whereupon the baffle piece 32 is gradually retracted in a specific direction by the downward movement of the upper mold member 12 against the spring 6 which is thereby compressed in a specific direction. In the case wherein the baffle pieces 32, 32 are provided in the lower and upper mold members 11, 12, the baffle pieces 32, 32 turn away the sushi rice thrusting there against during the downward movement of the upper mold member 12.

According to the invention, the sushi rice can be molded into nigiri-zushi as desired with substantially no sushi rice lodged between the flat and broad end surfaces of the intersections 31, 31 in the lower and upper mold members 11, 12. Generally the baffle piece 32 is projected by about 5 mm to turn away the sushi rice to a satisfactory extent.

The moldability of sushi moldings is enhanced by making the split mold 1, outer frame 2 and baffle piece 32 from a material of high releasability such as a fluorine-containing resin or polypropylene, or by applying such material of high releasability to the surfaces to be contacted with the sushi rice.

As described above, this invention provides a multi-cavity type utensil for molding sushi rice for use in preparing nigiri-zushi, the molding utensil having cavities with corners horizontally beveled or rounded free of the problem of sushi rice becoming lodged between the end surfaces of intersections in the lower and upper mold members.

I claim:

1. A multi-cavity utensil, comprising:
   a split mold including an upper mold member and a lower mold member, each mold member having molding cavities defined by intersecting partition walls, the intersecting partition walls intersecting at least one intersection, and an outer frame in which the split mold is removably fitted, wherein the cavities have corners extending in the vertical direction which are rounded or beveled, and wherein a vertically movable, spring-biased baffle piece is projected from an end surface of the intersection in at least one of the upper and lower mold members.

2. The multi-cavity utensil according to claim 1 wherein the cavities have horizontal corners extending in the horizontal direction between the intersecting partition walls and a cavity bottom or ceiling, and wherein said horizontal corners are also rounded or beveled.

* * * * *